Aug. 25, 1953 D. J. HINMAN 2,649,891
METHOD AND APPARATUS FOR MAKING PNEUMATIC TIRES
Filed June 21, 1951 2 Sheets-Sheet 1
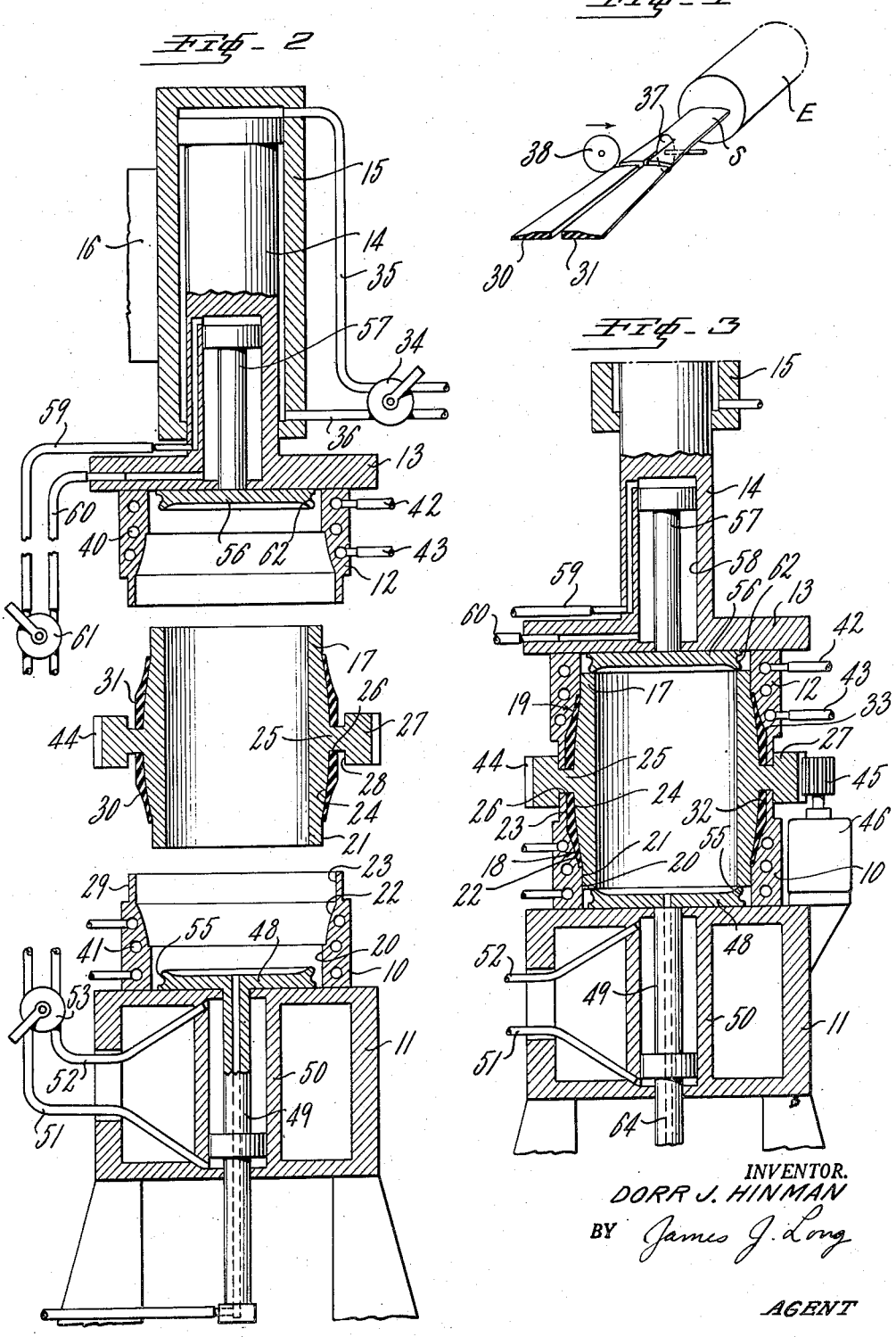
INVENTOR.
DORR J. HINMAN
BY James J. Long
AGENT

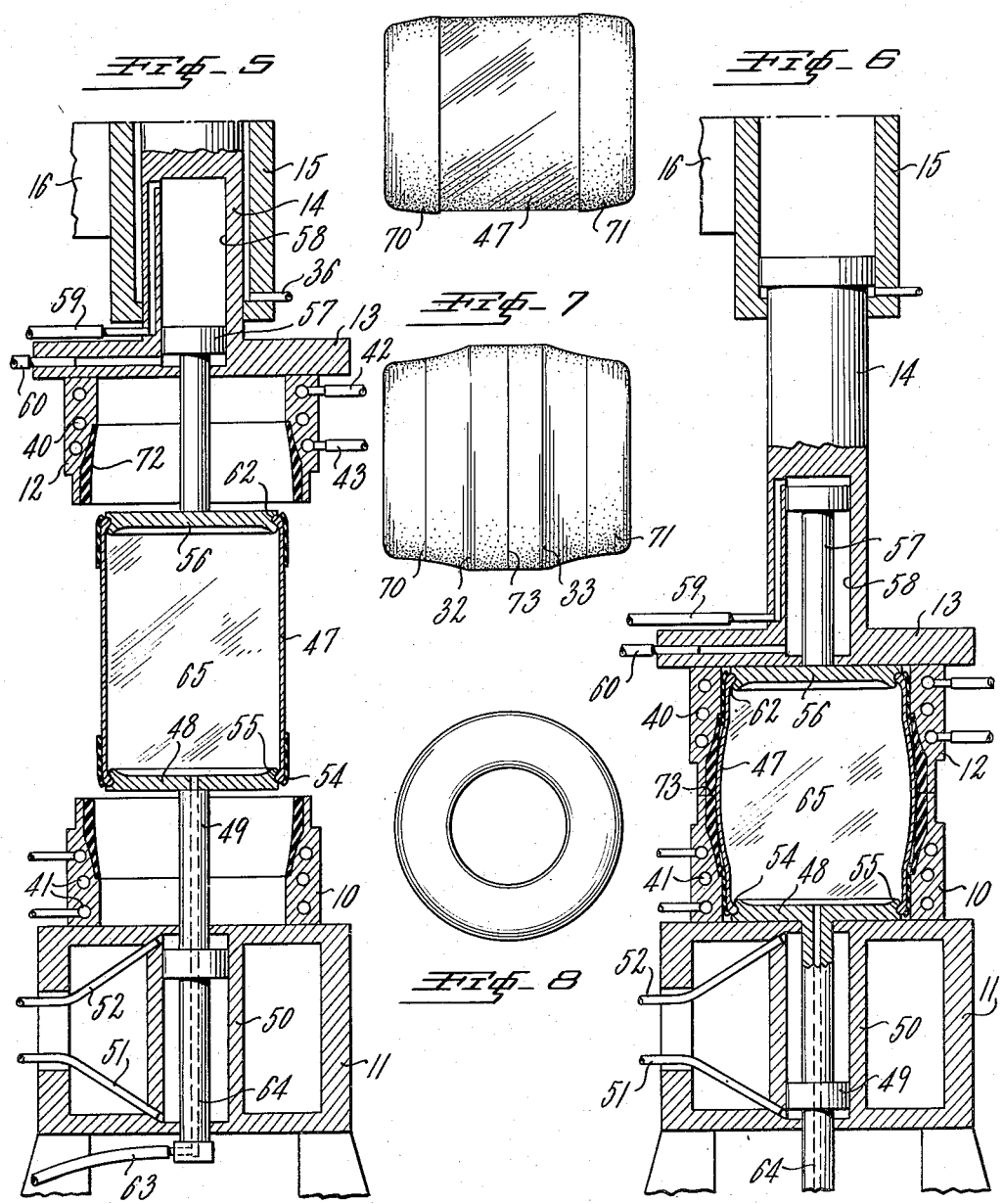

Patented Aug. 25, 1953

2,649,891

UNITED STATES PATENT OFFICE 2,649,891

METHOD AND APPARATUS FOR MAKING PNEUMATIC TIRES

Dorr J. Hinman, Detroit, Mich., assignor to United States Rubber Company, New York, N. Y., a corporation of New Jersey Application June 21, 1951, Serial No. 232,681

18 Claims. (Cl. 154—9)

This invention relates to a method and apparatus for making pneumatic tires, and more particularly it relates to a method for preparing a raw tire casing in generally flat band form.

One object of the invention is to provide an improved method of making pneumatic tires by molding the greater portion of the outer rubber covering of the tire.

Another object is the provision of a method of making pneumatic tires which avoids the necessity for any transverse splice in the tire.

Still another object is to provide a method of making pneumatic tires which insures that the tread will be uniform around the circumference of the tire, thereby reducing or eliminating the noise and undesirable riding characteristics encountered in tires that are not accurately balanced.

A further object of the invention is the provision of a method and apparatus for assembling a tire casing that is particularly adaptable for subsequent shaping and vulcanizing of the casing in that form of vulcanizing press adapted to receive the casing while still in band form.

The manner in which the invention accomplishes the foregoing objects, as well as additional objects and advantages, will be made manifest in the following detailed description of the invention, which is intended to be read with reference to the accompanying drawings, wherein:

Fig. 1 is a largely schematic perspective view showing a method of preparing approximately preformed portions of a tire tread;

Fig. 2 is a sectional elevational view of a molding press constructed according to the invention, shown in the open position;

Fig. 3 is a similar view showing the press in the closed position;

Fig. 4 is an elevational view of a raw tire carcass prepared in band form and having sidewall portions applied thereto;

Fig. 5 is a view of the open press similar to Fig. 1, showing a tire carcass being inserted therein;

Fig. 6 is a similar view of the press containing a tire carcass, in the closed position;

Fig. 7 is an elevational view of a completely assembled raw tire casing after removal from the molding press; and Fig. 8 is an elevational view of the completed tire.

According to the invention, the outer rubber covering, or tread, of the tire casing is molded in portions having a generally cylindrical or essentially flat band form so that they are adapted to be disposed over a raw tire carcass when the carcass is still in the form of a generally flat band, as built on the usual collapsible tire building drum. The assembly of carcass and tread is then shaped and vulcanized by suitable means, preferably in that type of unit vulcanizer adapted to receive the assembly in band form and containing an integral curing bag.

Referring to the drawing, and in particular to Figs. 2 and 3, the apparatus shown therein for carrying out the invention includes a molding press having a lower fixed cylindrical mold shell 10 secured to the upper surface of a lower framework 11 of the press, and a cooperating upper movable cylindrical mold shell 12, that is secured to the lower surface of a movable platen 13 carried by a vertically reciprocating piston 14 of a vertical hydraulic cylinder 15 secured to the upper framework 16 of the press. A removable cylindrical core member 17 is adapted to be disposed within the hollow interior of the mold shells 10, 12, and defines therewith, as indicated in Fig. 3, lower and upper annular mold cavities 18 and 19, each having the general shape of a transaxial half of the major portion of the outer rubber covering of a tire casing in the form of a generally flat band.

The lower portion 20 of the interior of the lower mold shell 10 is of reduced diameter and bears slidably against a flat portion 21 of the lower outer surface of the core 17 when the parts are brought into engagement as indicated in Fig. 3. Above the lower portion 20 the interior of the shell 10 is provided with a gradually outwardly enlarged area 22 forming a wall of the mold cavity 18 corresponding to the sloping shoulder portion of a tire tread. Above the sloping portion 22 there is provided on the interior of the shell 10 a further enlarged portion 23 of essentially constant diameter, forming a wall of the cavity 18, corresponding to the central or road-contacting portion of a tire tread. Above the flat portion 21 the exterior surface of the core 17 is provided with an area 24 that gradually increases in diameter toward the central horizontal plane of the core. When the mold parts are in engagement, the sloping surface 24 of the core 17 is disposed oppositely to and spaced from the surfaces 20 and 22 of the shell 10, thereby defining the inner wall of the lower mold cavity 18.

The core 17 has a horizontal flange portion 25 extending radially outwardly therefrom at its central plane, and the lower inner surface 26 of this flange defines the upper end wall of the cavity 18 when the mold is closed. The radially outer portion 27 of the flange 25 is of increased thickness, thereby defining a recess 28 which cooperates with a corresponding recess 29 in the upper outer surface of the shell 10, the contacting surfaces of the recesses 28, 29 bearing slidably against each other when the mold is closed.

The upper mold shell 12 is constructed similarly to the lower mold shell 10, and the upper half of the core 17 is constructed similarly to the lower half thereof, as just described.

The surfaces of the mold shell are adapted to receive strips 30 and 31 of rubber stock which are to be molded in the mold cavities 18 and 19 into transaxial halves 32 and 33 of the main body of the tire tread. In order to facilitate shaping of the strips 30 and 31 into the desired form with a minimum of distortion, the strips are preferably made in the general contour of the tire tread which they are intended to form. One method of forming the strips 30 and 31, as illustrated in Fig. 1, comprises extruding a continuous length S of rubber stock having the cross sectional shape of the central portion of the tire tread from an extruding device E, and slitting such length longitudinally by means of a suitably positioned knife 37. The extruded stock is cut transversely at suitable intervals by a skiving knife 38, producing the lengths 30 and 31 which may be spliced into annular form and placed on the surface of the core 17 as indicated in Fig. 2. Preferably the lengths 30 and 31 are spliced into bands which are slightly undersize in circumference with respect to the circumference of the core 17, so that they must be stretched slightly when applied to the core, and thereby cling to and substantially conform to the surfaces of the core. The preforms 30, 31 may be made of any suitable vulcanizable rubber stock and may either be composed entirely of one kind of stock, or may be composed of a plurality of stocks, e. g., they may be composed of a cap stock, that is, a highly abrasion-resistant tread stock in that portion that ultimately corresponds to the road-contacting surface of the tread, combined with a base stock in that portion that will ultimately be disposed underneath and to the side of the road-contacting portion.

Control of the movement of the upper mold half 12 into and out of engagement with the core 17 and the lower mold half 10 is effected by a conventional four way valve 34, from which hydraulic fluid lines 35, 36, supplied with hydraulic fluid from a suitable source (not shown), pass to each end of the cylinder 15 for actuating the piston mechanism 14 in either direction.

For circulating a heating or cooling medium through the body of the mold shells during the molding operation, internal passageways 40, 41 are provided, through which steam or other fluid heating medium, or cooling water, may be introduced from a suitable source (not shown) through inlet and outlet connections 42, 43.

In order to make it possible to rotate the core 17 with respect to the mold shells 10, 12 for the purpose of counteracting any shrinkage stresses in the molded forms 32, 33, in the manner described in detail in my copending application Serial No. 232,683, filed of even date herewith and assigned to the same assignee as the instant application, the outer periphery of the enlarged portion 27 of the flange 25 is provided with gear teeth 44 that are engaged, when the core is in molding position within the shells, by a pinion gear 45 driven by a suitable hydraulic motor 46 mounted on the lower frame 11 of the machine.

For associating the molded forms 32, 33 with a tire carcass 47, means are provided within the mold shells for supporting a tire carcass therein in band form in a vertical position. Such means include a lower movable horizontal bead flange 48 disposed concentrically of the lower mold shell 10 and mounted on the upper end of a hydraulic piston mechanism 49 that is adapted to be raised and lowered by means of a vertical hydraulic cylinder 50 contained in the base framework 11 of the machine, and supplied with hydraulic fluid through lines 51, 52 controlled by the usual valve 53. The peripheral edge of the bead flange 48 on which a bead portion 54 of the tire carcass 47 is adapted to be mounted, is provided with a recess 55 for receiving the bead in secure frictional engagement with the edge of the flange.

A similar upper horizontal movable bead flange 56 is mounted for vertical movement in the upper mold shell 12 by means of a vertical hydraulic mechanism 57 operating in a cylinder 58 contained in the lower portion of the interior of the upper piston 14 of the press, and supplied with hydraulic fluid through lines 59, 60, controlled by a valve 61. The upper bead flange 56 also has a peripheral recess 62 for accommodating a bead of the tire carcass 47.

For introducing fluid under pressure, usually air, to the interior of the carcass 47 when it is mounted on the flanges 48, 56 to aid in uniting the carcass to the molded portions 32, 33, a fluid inlet line 63 passes to the lower end of the hydraulic piston mechanism 49 extending from the lower framework of the machine, into communication with a passageway 64 extending upwardly through the center of the piston 49, and opening into the hollow interior 65 of the carcass.

The operation of the apparatus is as follows:

The formed bands 30, 31 of rubber stock are placed on the upper and lower lateral surfaces of the core piece 17, and the core piece is interposed between the mold shells 10, 12 while the press is in the open position, as indicated in Fig. 2. The bands 30, 31 are preferably at a suitable elevated temperature, e. g., 200° F., when they are placed on the core. Ordinarily, the preforms will retain sufficient heat from the previous extrusion operation by which they were formed to be at this temperature. It is also preferable that the core piece be preheated to an elevated temperature, e. g. 200° F. The mold shells 10, 12 are also preheated to an elevated temperature, e. g., approximately 250° F., as by circulating heated fluid through the passages 40, 41. The core 17 is lowered into the central opening of the lower mold shell 10, and the upper mold shell 12 is moved downwardly by actuating the hydraulic control valve 34 to motivate the piston mechanism 14 of the upper hydraulic cylinder 15 of the press. The mold core 17 carrying the raw rubber bands 30, 31 is thereby enclosed under pressure and at an elevated temperature by the mold shells 10, 12, and under the influence of such pressure and heat the rubber stock is shaped in the resulting mold cavities 18, 19 into annular bands 32, 33 having the shape of transaxial halves of the major portion of the outer rubber covering of a tire casing. This molding operation produces a flowing and compacting of the rubber stock that shapes the stock accurately in the desired form, and removes any irregularities originally present in the strips 30, 31.

With the mold in the closed position, cooling fluid is then circulated through the mold passages 40, 41 until the temperature of the mold has been reduced to the point where the molded forms are sufficiently rigid that any shrinkage stresses that have been set up during the molding operation are prevented from causing shrinkage of the forms when the pressure is released. With the usual stocks, it is found satisfactory to reduce the temperature of the mold to about 150° F. This prevents the molded stock from separating from the mold shells when the mold is opened. More advantageously, in place of cooling the mold in this manner, the mold core may be rotated by actuating the hydraulic motor 46, which rotates the core through the pinion gear 45 and the gear teeth 44 from the periphery of the core flange. For example, the core may be rotated 20° at such a speed that this degree of rotation is accomplished in 3 seconds, then allowed to rest in this position for 10 seconds, after which it is rotated in the opposite direction for 2° over a period of 1 second, and then allowed to rest for 10 seconds, whereupon the mold may be opened without encountering appreciable shrinkage of the molded forms. The effect of this rotation is to produce rotary shearing stresses in the molded forms 32, 33 which counteract any radial shrinkage stresses produced therein during the molding. This rotation method is disclosed in more detail in my copending application Serial No. 232,683, referred to above, and has the advantage that it does away with the need for cooling the mold before opening it, thereby effecting a saving of time, as well as economy of heat.

The mold cavity surfaces defined by the core 17 are such that they have less adhesion to the rubber stock than do the surfaces of the mold shells, and therefore the preforms 32, 33, remain in the mold shells when the mold is opened as indicated in Fig. 5. For this purpose the surfaces of the core may be highly polished chromium plating, or such surfaces may be suitably lubricated, while the surface of the mold shells may be relatively more adhesive, e. g., the shell surfaces may be matte finished chromium plating.

Having thus molded the preforms 32, 33, a raw tire carcass 47 is provided in the form of a generally flat annular band as shown in Fig. 4, suitably constructed by superimposing a plurality of plies of rubberized fabric on a collapsible tire building drum (not shown) and incorporating the usual inextensible wire beads (not shown) in the marginal edges of the carcass. There are also applied, along each lateral zone of the surface of the tire carcass, strips 70, 71 of vulcanizable rubber stock of a character suitable for formation of the tire sidewalls. These strips may be previously formed in suitable size by conventional methods, as by calendering or by extrusion. With the mold in the open position, the upper and lower bead flanges 56, 48 of the press are moved downwardly and upwardly respectively, by the action of the respective hydraulic cylinders 58, 50, into the space between the separated mold shells as indicated in Fig. 5. The marginal edges or bead portions of the carcass 47 are forced into the recesses 55, 62 at the peripheral edges of the bead flanges, thereby mounting the carcass 47 firmly and securely in place on the flanges. Thereafter, the upper hydraulic cylinder 15 of the press is actuated downwardly to lower the upper mold shell 12, and simultaneously the lower cylinder 50 is actuated downwardly to lower the lower bead flange 48. At the same time, hydraulic fluid is permitted to escape from the cylinder 58 of the upper bead flange so that this bead flange moves into the interior of the upper mold shell 12 into engagement with the lower surface of the upper platen 13 as the upper shell is lowered. The outer diameter of the carcass 47 including the applied sidewall strips 70, 71 is somewhat less than the internal diameter of the preforms 32, 33 contained in the mold, so that the carcass assembly is enabled to pass within the preforms. The inner diameter of the terminal flat portions, such as portion 20, of the mold shells is just sufficiently larger in diameter than the marginal portion of the carcass assembly that the assembly is enabled to slide therein without disruption. The outwardly sloping inner surface 72 (Fig. 5) of the molded preform, which is a consequence of the sloping configuration of the surface 24 of the core 17, facilitates the entrance of the carcass assembly into the mold shells. In the closed position of the press, as indicated in Fig. 6, the marginal edges of the preformed halves 33, 32 contact each other, and under the influence of applied heat and pressure the halves become firmly bonded together along a circumferential line of splice 73 to form a complete tire tread. In order to firmly unite the carcass assembly to the tread, internal pressure is applied to the hollow interior portion 65 of the carcass, as by applying air pressure to the carcass 65 through the passageway 64 and the connecting line 63. This internal pressure causes the carcass to bulge outwardly, as indicated in Fig. 6, firmly uniting the exterior surface of the carcass to the interior surface of the molded tread, and also firmly uniting the sidewall strips 70, 71 to the interior marginal areas of the preformed tread. For the latter purpose, the molded preformed portion slightly overlaps the inner edges of the sidewall strips 70, 71. Upon completion of this operation, the internal pressure in the cavity 65 is released, and the press is opened, leaving the resulting molded rubber cover on the carcass, to which the rubber has greater adherence than it has to the mold shells. The bead flanges are suitably actuated as the press is opened to bring the united carcass and tread out of the mold shells, and the assembled tire casing, after removal from the bead flanges, has the form of a generally flat annular band as indicated in Fig. 7.

The raw tire band formed in this manner is particularly adapted to be disposed in a unit vulcanizing press of the type described in U. S. Patent No. 2,495,664, which receives the raw tire in band form without any necessity for previously shaping the band in toroidal form, or for inserting a curing bag, and which contains an integral curing bag. In such a unit vulcanizer, the band is automatically shaped in toroidal form and encloses the integral curing bag as the press is closed. After curing, the finished tire 75 has the appearance shown in Fig. 8.

The tire made by the foregoing method is characterized by unusual uniformity and balance, due largely to the absence of any transverse splice in the tread, which is ordinarily a principal source of unbalance. Further uniformity results from the fact that the preform molding operation tends to remove any irregularities such as might ordinarily be present due to variations in the conventional extrusion operation by which tire treads are ordinarily made. As a result, the tires made by this method are unusually quiet in operation and have smooth riding qualities.

Having thus described my invention, what I claim and desire to protect by Letters Patent is:

1. A method of making pneumatic tires comprising molding transaxial portions of the central area of the outer rubber covering of a tire casing in the form of generally flat bands from vulcanizable rubber stock by application of heat and pressure in an enclosing mold, preparing a raw tire carcass in the form of a generally flat annular band, applying raw rubber sidewall strips to the lateral areas of the flat carcass band, applying the said molded flat bands to the central portion of the flat carcass band, and shaping and curing the assembly in annular toroidal form.

2. A method of making pneumatic tires comprising molding a transaxial section of the outer rubber covering of a tire casing in the form of a generally flat band from vulcanizable rubber stock by application of heat and pressure to the stock between an enclosing mold shell and a cooperating mold core, removing said mold shell from said core with the molded stock contained in the shell, substituting a raw tire carcass in the form of a generally flat annular band for said core, pressing said mold shell containing the molded transaxial section against the flat carcass band, applying heat and pressure to unite said molded section to the flat carcass band, applying another such complementary transaxial molded section to the flat carcass band in the same manner to completely cover the carcass, and shaping and curing the resulting assembly in annular toroidal form.

3. A method of making pneumatic tires comprising preparing an approximate preform from a vulcanizable rubber stock in the approximate shape of a transaxial section of the outer rubber covering of a tire casing in the form of a generally flat annular band, subsequently molding said form by application of heat and pressure thereto between an enclosing shell and a cooperating mold core, defining between them a cavity having the shape of the desired section of the tire casing and having the general form of a flat annular band, removing said mold shell from said mold core with the molded form contained in the shell, substituting a raw tire carcass in the form of a generally flat annular band for said core, pressing said mold shell containing the molded form against the flat carcass band, applying heat and pressure to unite said molded form to the flat carcass band, applying another such complementary form to the flat carcass band in the same manner to completely cover the carcass, and shaping and curing the resulting assembly in annular toroidal form.

4. A method of making a pneumatic tire comprising molding a transaxial section of the central area of the outer rubber covering of a tire casing in the form of a generally flat annular band from vulcanizable rubber stock by the application of heat and pressure to the stock between an enclosing mold shell and a cooperating mold core, preparing a raw tire carcass in the form of a generally flat annular band, applying raw rubber side wall strips to the lateral areas of the flat carcass band, removing said mold shell from the said core with the molded band contained in the core, applying to such mold shells containing molded bands to the flat carcass band to cover the central area thereof with said molded bands, uniting said bands to said carcass by application of heat and pressure and shaping and curing the assembly in annular toroidal form.

5. A method of making pneumatic tires comprising molding transaxial sections of the outer rubber covering of a tire casing in the form of generally flat bands from vulcanizable rubber stock by application of heat and pressure to the stock in an enclosing mold, applying the molded flat bands to the surface of a raw tire casing in the form of a generally flat band, applying internal fluid pressure directly to the interior of the tire carcass to firmly unite the molded bands to the flat carcass band, and thereafter shaping and curing the resulting assembly in annular toroidal form.

6. A method of making pneumatic tires comprising molding a transaxial section of the outer rubber covering of a tire casing in the form of a generally flat band from vulcanizable rubber stock by application of heat and pressure to the rubber stock between an enclosing mold shell and a cooperating mold core, removing said mold shell from said mold core with the molded stock contained in the shell, substituting a raw tire carcass in the form of a generally flat annular band for said core, pressing said mold shell containing the molded transaxial section against the flat carcass band, applying fluid pressure directly to the interior of the flat carcass band to unite the carcass to said molded section while said section is in a heated state, applying another such complementary transaxial molded section to the flat carcass band in the same manner to completely cover the carcass, and shaping and curing the resulting assembly in annular toroidal form.

7. A method of making pneumatic tires comprising molding a transaxial section of the central area of the outer rubber covering of a tire casing in the form of a generally flat band from vulcanizable rubber stock by application of heat and pressure to the rubber stock between an enclosing mold shell and a cooperating mold core, preparing a raw tire carcass in the form of a generally flat annular band, applying raw rubber side wall strips to the lateral areas of the flat carcass band, cooling said molded bands while still retained between said shell and core, removing said mold shell from said core with the molded band contained in the core, applying two such mold shells containing molded bands to the flat carcass band to cover the central area thereof with said molded bands, uniting said bands to said carcass by application of heat and pressure, and shaping and curing the assembly in annular toroidal form.

8. A method of making pneumatic tires comprising molding a transaxial section of the outer rubber covering of a tire casing in the form of generally flat bands from vulcanizable rubber stock by application of heat and pressure to the stock between an enclosing mold shell and a cooperating mold core having less adhesion to the stock than the shell has, removing said mold shell from said mold core with the molded stock contained in the shell, substituting a raw tire carcass in the form of a generally flat annular band for said core, pressing said mold shell containing the molded transaxial section against the flat carcass band, applying heat and pressure to unite said molded section to the flat carcass band, applying another such complementary transaxial molded section to the flat carcass band in the same manner to completely cover the carcass, and shaping and curing the resulting assembly in annular toroidal form.

9. A method of making pneumatic tires comprising molding transaxial sections of the central portion of the outer rubber covering of a tire casing in the form of annular bands from vulcanizable rubber stock by application of heat and pressure to the stock between two enclosing mold shells and a cooperating mold core, removing said shells from said core with the molded bands contained in the shells, preparing a raw tire carcass in the form of a flat annular band, applying raw rubber sidewall strips to the lateral zones of the flat carcass band, the external diameter of the carcass assembly being less than the internal diameter of said molded bands, bringing said shells containing the molded bands into engagement with such flat carcass band at an elevated temperature, applying internal fluid pressure to the interior of the carcass to press it firmly against the interior surfaces of said bands, to unite said carcass and bands, the bands being united at the same time along circumferential lines of splice to each other and to the said sidewall strips, removing the resulting assembly from the mold shells in band form, and shaping and curing the assembly in annular toroidal form.

10. A method of making pneumatic tires comprising preparing an approximate preform from vulcanizable rubber stock in the approximate shape of a transaxial section of the central portion of the outer rubber covering of a tire casing in the form of a generally flat annular band, molding said preform bands by application of heat and pressure thereto between two enclosing mold shells and a cooperating mold core, removing said shells from said core with the molded bands contained in the shells, preparing a raw tire carcass in the form of a flat annular band, applying raw rubber sidewall strips to the lateral zones of the flat carcass band, the external diameter of the carcass assembly being less than the internal diameter of said molded bands, bringing said shells containing the molded bands into engagement with said flat carcass band at an elevated temperature, applying internal fluid pressure to the interior of the carcass to press it outwardly against the interior surfaces of said bands to unite said carcass and bands, the bands being united at the same time along circumferential lines of splice to each other and to the said sidewall strips, removing the resulting assembly from the mold shells in band form, and shaping and curing the assembly in annular toroidal form.

11. Apparatus for making pneumatic tires comprising a mold shell and a cooperating mold core defining between them a mold cavity having the shape of a transaxial section of the outer rubber covering of a pneumatic tire casing in the form of a generally flat annular band, means for moving said shell into and out of engagement with said core, means for supporting a raw tire carcass in the form of an annular band within said mold shell, and means for moving said supporting means into and out of said shell.

12. Apparatus for making pneumatic tires comprising a mold shell and a cooperating mold core defining between them a mold cavity having the shape of a transaxial section of the outer rubber covering of a pneumatic tire casing in the form of a generally flat annular band, means for moving said shell into and out of engagement with said core, means for supporting a raw tire casing in the form of an annular band within said mold shell, means for moving said supporting means into and out of engagement with said shell, and means for introducing a fluid under pressure into the interior of a carcass supported on said supporting means.

13. Apparatus for making pneumatic tires comprising a pair of oppositely disposed mold shells, a cooperating mold core adapted to be disposed between said shells, said mold and core defining between them mold cavities having the shape of transaxial sections of the outer rubber covering of a pneumatic tire casing in the form of a generally flat annular band, means for moving said mold shells into and out of engagement with said core, means for supporting a raw pneumatic tire casing in the form of an annular band within said mold shells, and means for moving said supporting means into and out of said shells.

14. Apparatus for making pneumatic tires comprising a pair of oppositely disposed mold shells, a cooperating mold core adapted to be disposed between said shells, said mold and core defining between them mold cavities having the shape of transaxial sections of the outer rubber covering of a pneumatic tire casing in the form of a generally flat annular band, means for moving said mold shells into and out of engagement with said core, means for supporting a raw pneumatic tire casing in the form of an annular band within said mold shells, means for moving said supporting means into and out of said shells, and means for introducing a fluid under pressure into the interior of a carcass supported on said supporting means.

15. Apparatus for making pneumatic tires comprising a mold shell and a cooperating mold core defining between them a mold cavity having the shape of a transaxial section of the outer rubber covering of a pneumatic tire casing in the form of a generally flat annular band, means for moving said shell into and out of engagement with said core, a flange within said shell, and movable axially with respect to said shell, adapted to engage frictionally along its marginal edge a bead of a raw pneumatic tire casing in the form of an annular band, and means for moving said flange into and out of said shell.

16. Apparatus for making pneumatic tires comprising a pair of hollow mold shells, a cooperating mold core adapted to be disposed between said shells, said shells and core defining mold cavities having the shape of a transaxial section of the outer rubber covering of a pneumatic tire casing in the form of a generally flat annular band, means for moving said shells into and out of engagement with said core, flanges disposed within each of said shells, and movable axially with respect to said shells, for supporting a pneumatic tire casing in annular band form within said shells, and means for moving said flanges into and out of said shells.

17. Apparatus for making pneumatic tires comprising a pair of hollow mold shells, a cooperating mold core adapted to be disposed between said shells, said shells and core defining mold cavities having the shape of a transaxial section of the outer rubber covering of a pneumatic tire casing in the form of a generally flat annular band, means for moving said shells into and out of engagement with said core, flanges disposed within each of said shells, and movable axially with respect to said shells, for supporting a pneumatic tire casing in annular band form within said shells, means for moving said flanges into and out of said shells and means for introducing a fluid under pressure into the interior of a carcass supported on said flanges.

18. Apparatus for making pneumatic tires comprising a pair of hollow mold shells, a cooperating mold core adapted to be disposed between said shells, said shells and core defining mold cavities having the shape of a transaxial section of the outer rubber covering of a pneumatic tire casing in the form of a generally flat annular band, means for moving said shells into and out of engagement with said core, flanges disposed within each of said shells, and movable axially with respect to said shells, for supporting a pneumatic tire casing in annular band form within said shells, means for moving said flanges into and out of said shells, and means for introducing a fluid under pressure into the interior of a carcass supported on said flanges, the interior walls of the mold cavities defined by said core sloping gradually outwardly toward the central plane of the core to provide outwardly sloping surfaces on the interior of rubber bands molded in said cavities, whereby movement of a tire carcass into the interior of said bands is facilitated.

DORR J. HINMAN.

References Cited in the file of this patent

UNITED STATES PATENTS

| Number | Name | Date |
| --- | --- | --- |
| 2,476,884 | Maynard | July 19, 1949 |
| 2,497,226 | NcNeill | Feb. 14, 1950 |
| 2,569,935 | Leguillon et al. | Oct. 2, 1951 |